J. RICH.
Lathe Chuck.
No. 104,063.
Patented June 7, 1870.
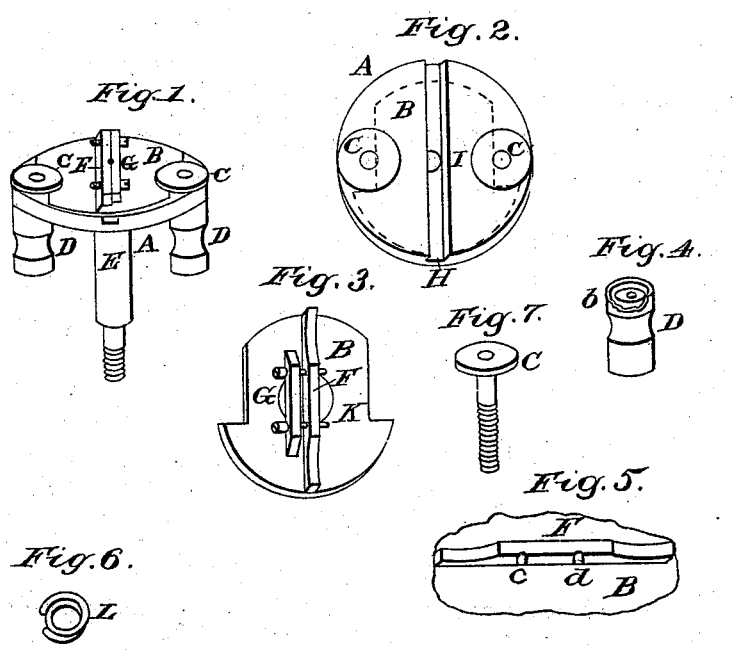

United States Patent Office.

JOHN RICH, OF PAINESVILLE, OHIO.

Letters Patent No. 104,063, dated June 7, 1870.

IMPROVED LATHE-CHUCK.

The Schedule referred to in these Letters Patent and making part of the same.

*To all whom it may concern:*

Be it known that I, JOHN RICH, of Painesville, in the county of Lake and State of Ohio, have invented certain Improvements in Chucks; and I do hereby declare the following is a full and exact description thereof, which will enable those skilled in the art to make and use the same, reference being had to the accompanying drawings and letters of reference marked thereon, in which—

Figure I is a perspective view, showing the chuck complete in all its parts; A, plate with the groove H across its diameter; B, sliding plate, with the jaw F attached thereto. The movable jaw G is attached to the jaw F by screws. C C, heads of screw-bolts, to secure the plate B to the plate A; D D, nuts to tighten up the screw-bolts; E, stem secured to plate A.

Figure II, plate A, and showing the groove H, the countersunk hole I, and heads of screw-bolts C C. The dotted lines show the position of plate B.

Figure III, plate B; F, jaw firmly attached to plate B; G, movable jaw, attached to jaw F by screws; K, circular opening cut in plate B.

Figure IV, nut D, b, seat to receive coiled spring; a, hole for bolt.

Figure V shows part of plate B, and jaw F; c is a half-round hole, and d a V-shaped hole to gripe the article to be acted on.

Figure VI, coiled spring L.

Figure VII, C, screw-bolt.

The letters of reference indicate similar parts in all the figures.

The improvements herein referred to consist in the employment of the plate A, with the plate B sliding on it, and secured by the screw-bolts C C. I am aware that patents have been granted for this style of chuck, but the coiled springs have been applied under the head of the screw-bolts, and on top of the plate, necessitating the projection of the bolt-heads too high above the top surface of the plate, but in this improvement the springs are confined in a seat turned out of the upper end of the nuts D, which allows the heads of bolts C to be made much thinner, and, for that reason, more out of the way. The groove H, in plate A, allows the article, if it projects below the lower surface of plate B, to pass freely to its place. The hole C, in jaw F, as shown in Fig. V, is half a circle, and allows an article that is round to be held without marring it, and the hole d is V-shaped, and for the same purpose.

The following is a description of the construction and operation of my improvement:

A, Fig. I, is a circular plate secured to the stem E; B is a plate sliding on the plate A, and secured to the plate A by the screw-bolts C C, said plate B having a jaw, F, firmly secured to it, and the opposing jaw, G, secured to the jaw F by screws. The nuts D D have their upper end turned out, and forming a seat to receive the coiled springs L. When the article to be acted on is firmly secured in the jaws, the plate B is slid to its place, the nuts D turned up just enough so that the springs L bear just hard enough against the plate to hold it. The chuck is then revolved, and a piece of soft wood is held against the article until it is exactly centered; then the bolts D are screwed fast.

What I claim as my invention, and desire to secure by Letters Patent, is—

The combination of the plates A and B, bolts C, recessed nuts D, and springs L, as described and for the purpose specified.

JOHN RICH.

Witnesses:
 WM. PETTINGELL,
 CALVIN WORDWELL.